(12) United States Patent
Lindoff et al.

(10) Patent No.: US 7,894,555 B2
(45) Date of Patent: Feb. 22, 2011

(54) IQ IMBALANCE IMAGE SUPPRESSION

(75) Inventors: Bengt Lindoff, Bjärred (SE); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 855 days.

(21) Appl. No.: 11/832,695

(22) Filed: Aug. 2, 2007

(65) Prior Publication Data

US 2009/0034666 A1 Feb. 5, 2009

(51) Int. Cl.
*H03D 1/04* (2006.01)
*H04B 1/707* (2006.01)

(52) U.S. Cl. ...................... 375/346; 375/147

(58) Field of Classification Search ............ 375/235, 375/260, 349, 350, 344, 346, 345, 329, 130, 375/140, 147, 316, 259
See application file for complete search history.

(56) References Cited

U.S. PATENT DOCUMENTS

| | | | |
|---|---|---|---|
| 6,442,217 B1 | 8/2002 | Cochran | |
| 6,515,980 B1 | 2/2003 | Bottomley | |
| 6,999,501 B1 | 2/2006 | Sawyer | |
| 7,010,278 B2 | 3/2006 | Kirschenmann et al. | |
| 7,035,341 B2 | 4/2006 | Mohindra | |
| 7,076,008 B2 * | 7/2006 | Jeong | 375/345 |
| 7,082,174 B1 * | 7/2006 | Smee et al. | 375/349 |
| 7,130,359 B2 | 10/2006 | Rahman | |
| 7,133,657 B2 | 11/2006 | Kuenen et al. | |
| 7,173,988 B2 * | 2/2007 | Cochran et al. | 375/346 |
| 7,177,372 B2 | 2/2007 | Gu | |
| 7,184,714 B1 | 2/2007 | Kutagulla et al. | |
| 7,190,733 B2 | 3/2007 | Sugar | |
| 7,242,730 B2 | 7/2007 | Kasperkovitz | |

| | | |
|---|---|---|
| 2003/0007574 A1 | 1/2003 | Li et al. |
| 2003/0072393 A1 | 4/2003 | Gu |
| 2003/0165203 A1 | 9/2003 | Mohindra |
| 2004/0095993 A1 | 5/2004 | Liu et al. |
| 2004/0165678 A1 | 8/2004 | Nadiri |
| 2005/0070236 A1 | 3/2005 | Paulus |
| 2005/0152476 A1 | 7/2005 | Coersmeier |
| 2005/0243218 A1 | 11/2005 | Yee et al. |

(Continued)

FOREIGN PATENT DOCUMENTS

EP 1 416 691 3/2006

OTHER PUBLICATIONS

Li Yu et al., A Novel Adaptive Mismatch Cancellation System for Quadrature IF Radio Receivers, IEE Transactions on Circuits and systems II: Express Briefs, IEEE Service Center, New York, NY, US, vol. 46, No. 6, Jun. 1, 1999.

(Continued)

*Primary Examiner*—Kevin M Burd
(74) *Attorney, Agent, or Firm*—Coats & Bennett, P.L.L.C.

(57) ABSTRACT

A WCDMA receiver performs baseband suppression of the image signal component caused by IQ imbalance. An IQ imbalance image scaling factor is computed from conventional channel estimates and estimates of the IQ imbalance image channel, the latter computed using a conjugated scrambling sequence as the reference sequence for despreading. An IQ imbalance image estimate is obtained by scaling the complex conjugate of the received signal by the IQ imbalance image scaling factor, and is subtracted from the input signal prior to applying traditional baseband demodulation algorithms.

21 Claims, 6 Drawing Sheets

U.S. PATENT DOCUMENTS

| | | |
|---|---|---|
| 2006/0034218 A1 | 2/2006 | Ozluturk et al. |
| 2006/0153318 A1 | 7/2006 | Sugar |
| 2006/0229051 A1 | 10/2006 | Narayan et al. |
| 2006/0252399 A1 | 11/2006 | Paulus |
| 2006/0256216 A1 | 11/2006 | Takahiko et al. |
| 2006/0270375 A1 | 11/2006 | Beamish et al. |
| 2006/0281411 A1 | 12/2006 | Isaac et al. |
| 2007/0025474 A1* | 2/2007 | Moorti et al. ............... 375/329 |
| 2007/0081614 A1 | 4/2007 | Su |
| 2007/0097271 A1 | 5/2007 | Gao et al. |
| 2007/0116149 A1 | 5/2007 | Sugar |
| 2007/0127599 A1* | 6/2007 | Song et al. ................. 375/326 |
| 2007/0263667 A1* | 11/2007 | Dubuc et al. ............... 370/500 |

OTHER PUBLICATIONS

Cao, M. et al. "Parametric Modeling in Mitigating the I/Q Mismatch: Estimation, Equalization, and Performance Analysis." Annual Conference on Information Sciences and Systems, Mar. 2006, pp. 1286-1290.

Lohtia, A. et al. "An Adaptive Digital Technique for Compensating for Analog Quadrature Modulator / Demodulator Impairments." IEEE Pacific Rim Conference on Communications, Computers and Signal Processing, May 1993, vol. 2, pp. 447-450.

Zhu, Z. et al. "Bias Analysis of a Gain/Phase/DC-Offset Estimation Technique for Direct Frequency Conversion Modulators." IEEE International Conference on Acoustics, Speech, and Signal Processing, Mar. 2005, vol. 3, pp. iii/825-iii/828.

Yu, J. et al. "A Novel Technique for I/Q Imbalance and CFO Compensation in OFDM Systems." IEEE International Symposium on Circuits and Systems, May 2005, vol. 6, pp. 6030-6033.

Yamaoka, A. et al. "A Novel Error Separation Technique for Quadrature Modulators and Demodulators." IEEE Radio and Wireless Symposium, Jan. 2007, pp. 563-566.

Xing, G. et al. "Frequency Offset and I/Q Imbalance Compensation for Direct-Conversion Receivers." IEEE Transactions on Wireless Communications, Mar. 2005, vol. 4, No. 2, pp. 673-680.

Yan, F. et al. "Carrier Frequency Offset Estimation for OFDM Systems with I/O Imbalance." The 47th IEEE International Midwest Symposium on Circuits and Systems, Jul. 25-28, 2004, vol. 2, pp. II-633-II-636.

Tubbax, J. et al. "Joint Compensation of I/Q Imbalance and Frequency Offset in OFDM Systems." Proceedings of Radio and Wireless Conference 2003 (RAWCON '03), Aug. 10-13, 2003, pp. 39-42.

Simoens, S. et al. "New I/Q Imbalance Modeling and Compensation in OFDM Systems with Frequency Offset." The 13th International Symposium on Personal, Indoor and Mobile Radio Communications 2002, Sep. 15-18, 2002, vol. 2, pp. 561-566.

Lindoff, B. et al. "IQ Imbalance Image Suppression in Presence of Unknown Phase Shift." Co-pending U.S. Appl. No. 11/949,481, filed Dec. 3, 2007.

Valkama, Mikko et al. "A Novel Image Rejection Architecture for Quadrature Radio Receivers." IEEE Transactions on Circuits and Systems II: Express Briefs, Feb. 2002, vol. 51, No. 2, pp. 61-68.

* cited by examiner

IQ IMBALANCE IMAGE SUPPRESSION

FIELD OF THE INVENTION

The present invention relates generally to CDMA wireless communications, and in particular to reducing received signal degradation caused by IQ imbalance.

BACKGROUND

Cellular wireless communication systems, and in particular Code Division Multiple Access (CDMA) systems, are well known in the art and widely deployed. The High Speed Packet Access (HSPA) Evolution track of Wideband CDMA (WCDMA) will provide dramatically increased data rates by combining multiple-antenna techniques and higher-order modulation. For example, in the downlink, 2×2 multiple-input, multiple-output (MIMO) transmission and 64-QAM modulation will be used, allowing up to triple the data rates achievable with current, single-antenna transmission and 16-QAM. It is expected that these peak data rates will be achievable in "good conditions," where the propagation channel-induced interference and interference from other external sources is low. Instead, the receiver front-end impairments are expected to become the limiting factors. Such impairments are particularly troublesome since their impact cannot be removed by means of power allocation or interference coordination. When the desired Signal to Interference Ratio (SIR) at the antenna is made high, the RF impairments will become the dominant disturbance and cause error floors and/or throughput ceilings. Some typical such impairments are IQ imbalance, phase noise, DC leakage, quantization and thermal noise, etc.

In order to take advantage of the MIMO and Higher Order Mode (HOM) features, it has been estimated that the overall receiver front-end output Signal to Noise Ratio (SNR) must be several dB higher, compared to that required for single-stream 16-QAM. Improving the quality of the RF circuitry in order to increase the output SNR increases the cost of the hardware considerably. This increase may be avoided or limited if the subsequent baseband processing stage could handle a lower-quality input signal, e.g. by performing additional operations to remove the impairment components.

In a typical cost-efficient RF circuit design, one important front-end impairment is the IQ imbalance. The IQ imbalance can originate at several points in the receiver, such as the local oscillator (LO) (at both the transmitter and the receiver); the variable-gain amplifier (VGA) chain; the analog to digital converter (ADC); and also due to variations in the cut-off frequency in the I and Q selectivity filters, giving rise to undesired signal images. The different IQ imbalance contributions accumulate coherently and hence may comprise one of the most dominant RF impairments. The impact of the IQ imbalance can be reduced to an acceptable level by utilizing an RF design with sufficient quality. However, a lower-quality but more cost-efficient RF front end may be used if the IQ imbalance image component could be removed or significantly reduced by baseband processing.

SUMMARY

According to one or more embodiments presented herein, a system and method suitable for WCDMA receivers performs baseband suppression of the image signal component caused by IQ imbalance. An IQ imbalance image scaling factor is computed from conventional channel estimates and estimates of the IQ imbalance image channel, the latter computed using a conjugated scrambling sequence as the reference sequence for despreading. An IQ imbalance image estimate is obtained by scaling the complex conjugate of the received signal by the IQ imbalance image scaling factor, and is subtracted from the input signal prior to applying traditional baseband demodulation algorithms.

One embodiment relates to a method of processing a received CDMA signal in a receiver. An IQ imbalance image scaling factor is estimated. An IQ imbalance image estimate is computed by scaling the complex conjugate of the received signal by the IQ imbalance image scaling factor. The IQ imbalance image estimate is then subtracted from the received signal.

Another embodiment relates to a WCDMA receiver. The receiver includes an RF front end circuit operative to receive a WCDMA signal from an antenna and output a complex baseband received signal comprising in-phase and quadrature components. The receiver also includes an IQ imbalance image scaling factor estimator operative to generate an IQ imbalance image scaling factor, and an IQ imbalance image estimate generator operative to scale the complex conjugate of the received signal by the IQ imbalance image scaling factor. The receiver further includes a subtractor operative to subtract the IQ imbalance image estimate from the received signal.

DETAILED DESCRIPTION

Figure 1:
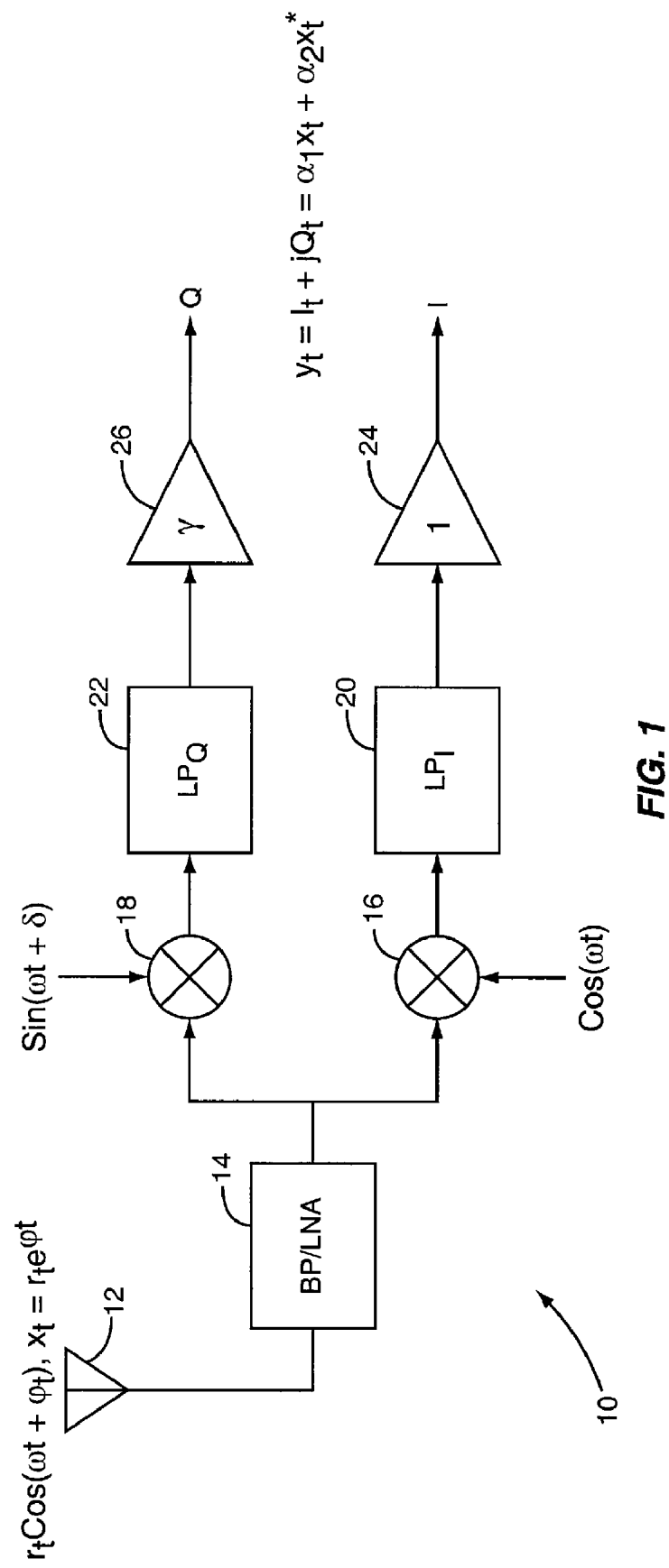
FIG. 1 is a functional block diagram of a receiver depicting sources of IQ imbalance.

FIG. 1 depicts an RF receiver 10 demonstrating several sources of IQ imbalance. The transmitted signal $x_t$, received at the antenna 12, may be modeled as $r_t e^{\phi_t}$ or $r_t \cos(\omega t + \phi_t)$ where the term $\phi_t$ represents an error in the transmitter LO which contributes to IQ imbalance. The received signal is front-end processed by the band-pass filter and low noise amplifier 14, and In-phase (I) and Quadrature (Q) signal components are separated by multiplying by phase-offset periodic signals from the receiver LO at multipliers 16, 18. A phase imbalance in the LO signals, represented by the $\delta$ term in $\sin(\omega t + \delta)$ also contributes to IQ imbalance. Further IQ imbalance may be contributed by cut-off frequency variations in the I and Q low-pass filters 20, 22, and still further IQ imbalance may arise from a gain imbalance $\gamma$ in the I and Q VGAs 24, 26. As depicted in FIG. 1, the complex output signal $y_t$ may be expressed in terms of its In-phase and Quadrature components, $I_t + jQ_t$, or as more fully described herein, a scaled version of the transmitted signal plus an IQ imbalance image component, $\alpha_1 x_t + \alpha_2 x_t^*$.

Using the notation defined above, the image rejection ratio (IRR)—a performance measure traditionally used to characterize the impact of IQ imbalance—is calculated as $$IRR = \left|\frac{1+\gamma e^{-j\delta}}{1-\gamma e^{j\delta}}\right|^2 \quad (1)$$

Due to the linear nature of the IQ imbalance mechanism, the contributions of the transmitter and the various receiver stages, as depicted in FIG. 1, may be lumped together into a single term and treated jointly. IQ imbalances add as amplitudes, i.e., two IQ imbalance sources with 30 dB image rejection each give rise to a total (worst case, if the imbalances have same direction) 24 dB image rejection. In MIMO scenarios in WCDMA, the Common Pilot Channel (CPICH) used for estimating the channel will yield channel estimates very close the ideal channel (e.g., channel estimate SNRs in the order of 40-50 dB for the strongest path). Hence, even if the IRR is high (in the order of 25-30 dB), an IQ imbalance image channel estimate in these high-SNR MIMO scenarios will be quite good (e.g., with a channel estimate SNR in the order of 10-20 dB). Furthermore, assuming the IQ imbalance image scaling factor is a slowly varying parameter, averaging the scaling factor over a relatively long time, such as several slots, may improve the quality of the IQ imbalance image estimate.

Mathematically, assume the complex valued signal $x_t$ is affected by an IQ imbalance. We can model all IQ imbalance sources as a single, lumped "IQ imbalance unit." The output of this "IQ imbalance unit," $y_t$, may be written according to $$y_t = \alpha_1 x_t + \alpha_2 x_t^* \text{ where}$$

$$\alpha_1 = \frac{1+\gamma e^{-j\delta}}{\sqrt{2(1+\gamma^2)}} \approx 1 \text{ and}$$

$$\alpha_2 = \frac{1-\gamma e^{j\delta}}{\sqrt{2(1+\gamma^2)}}$$

Here, $\alpha_2$ is the IQ imbalance image scaling factor and IRR is defined in equation (1).

As mentioned above, in CDMA-based wireless communications systems, such as WCDMA, pilot signals (CPICH) are available for channel estimation. After passing through the "IQ imbalance unit," the pilot signal also acquires an IQ imbalance image component that corresponds to the conjugate scrambling code having passed through the conjugate of the multipath channel response. One way to estimate the IQ imbalance image scaling factor is to use the strongest path for simplicity (extensions to using multiple paths are obvious). First, the pilot channel is de-spread conventionally to obtain a signal channel estimate (i.e., multiply by $s_t^* c_t^{CPICH}$ where $s_t$ is the scrambling code and $c_t^{CPICH}$ is the pilot signal, or CPICH, spreading code):

$$\hat{h} \approx \alpha_1 h_{channel} \approx h_{channel} \quad (2)$$

Next, a corresponding IQ imbalance image channel estimate is obtained by de-spreading using the "conjugate CPICH," i.e., multiplying by $s_t c_t^{CPICH}$ (note that only the scrambling code $s_t$ is complex; the spreading code $c_t^{CPICH}$ is real):

$$\hat{h}_{IQimbalance} \approx \alpha_2 h_{channel}^* \approx \alpha_2 \hat{h}^* \quad (3)$$

Then, from equations (2) and (3), the IQ imbalance image scaling factor $\alpha_2$ is estimated as $$\hat{\alpha}_2 = \frac{\hat{h}_{IQimbalance}}{\hat{h}^*} \quad (4)$$

An estimate of the IQ imbalance image component of the received signal is obtained by scaling the complex conjugate of the received signal, $y_t^*$, by the IQ imbalance image scaling factor $\alpha_2$. Due to the fact that $|\alpha_1|^2 >> |\alpha_2|^2$, the IQ imbalance image estimate may be subtracted from the received signal $y_t$ to obtain an approximation of the received signal without the IQ imbalance image component, which is very close to the transmitted signal:

$$\tilde{y}_t = y_t - \hat{\alpha}_2 y_t^* \approx x_t \quad (5)$$

Figure 2:
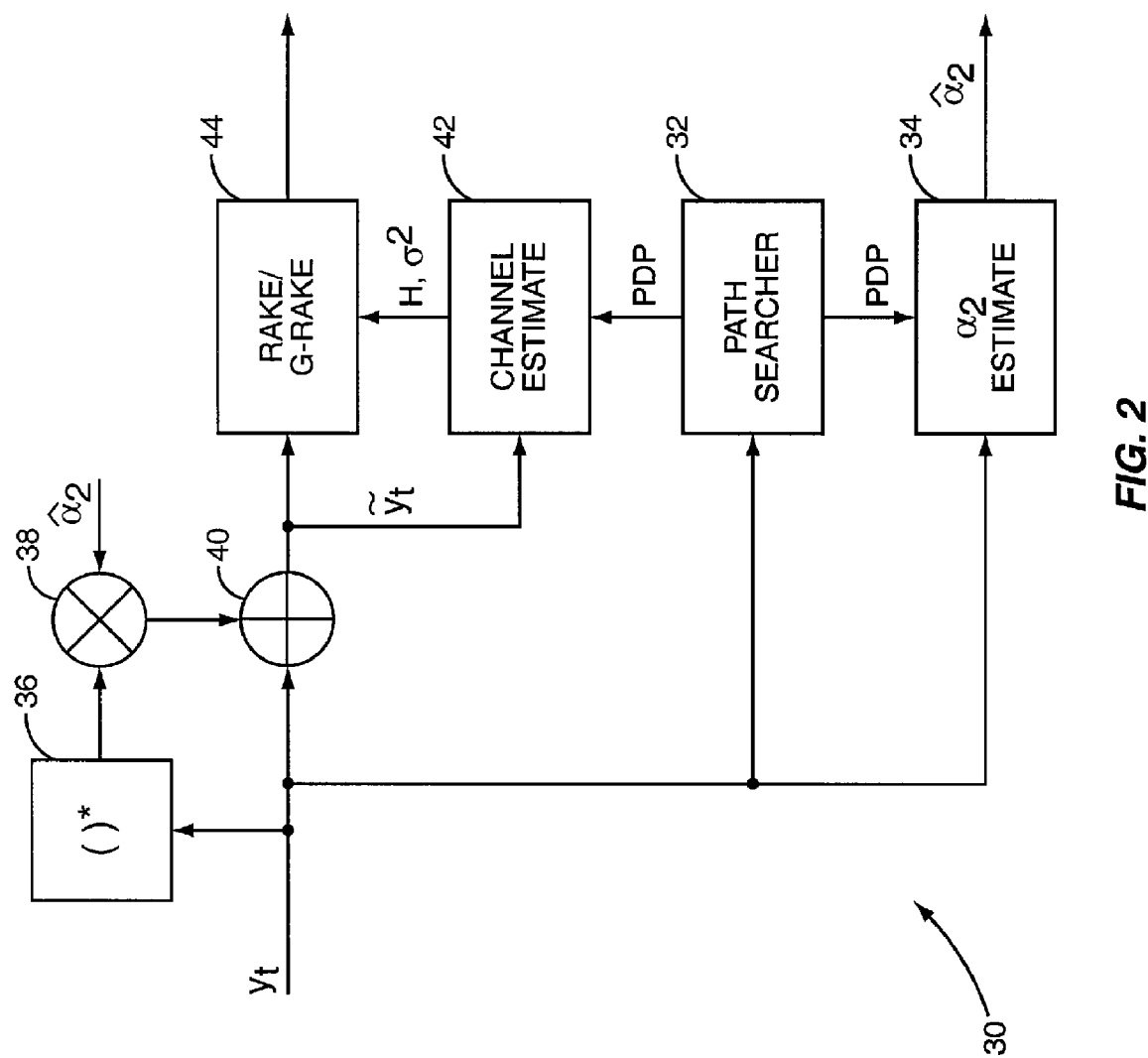
FIG. 2 is a functional block diagram of a receiver calculating and subtracting an IQ imbalance image estimate from a received signal prior to baseband processing.

The functional block diagram of FIG. 2 depicts the removal of an IQ imbalance image estimate from a received signal $y_t$ prior to further baseband processing in a representative receiver 30. The received multi-path signal $y_t$ is directed to a path searcher function 32, which generates power delay profiles (PDP) for channel estimation, as is conventionally known. The path searcher function 32 additionally provides the PDPs to an IQ imbalance image scaling factor estimation function 34, which estimates an IQ imbalance image scaling factor $\hat{\alpha}_2$. The complex conjugate of the received signal $y_t$ is calculated at block 36, and scaled by the IQ imbalance image scaling factor estimate $\hat{\alpha}_2$ at multiplier 38 to yield an estimate of the IQ imbalance image in the signal $y_t$. This IQ imbalance image estimate is subtracted from the received signal $y_t$ at adder 40, and the IQ imbalance image-suppressed signal $\tilde{y}_t$ is passed to a Rake or Generalized-Rake (G-Rake) receiver 44 for demodulation. The channel estimate function 42 generates channel estimates for the Rake/G-Rake receiver 44, and additionally for the IQ imbalance image scaling factor estimator 34.

Figure 3:
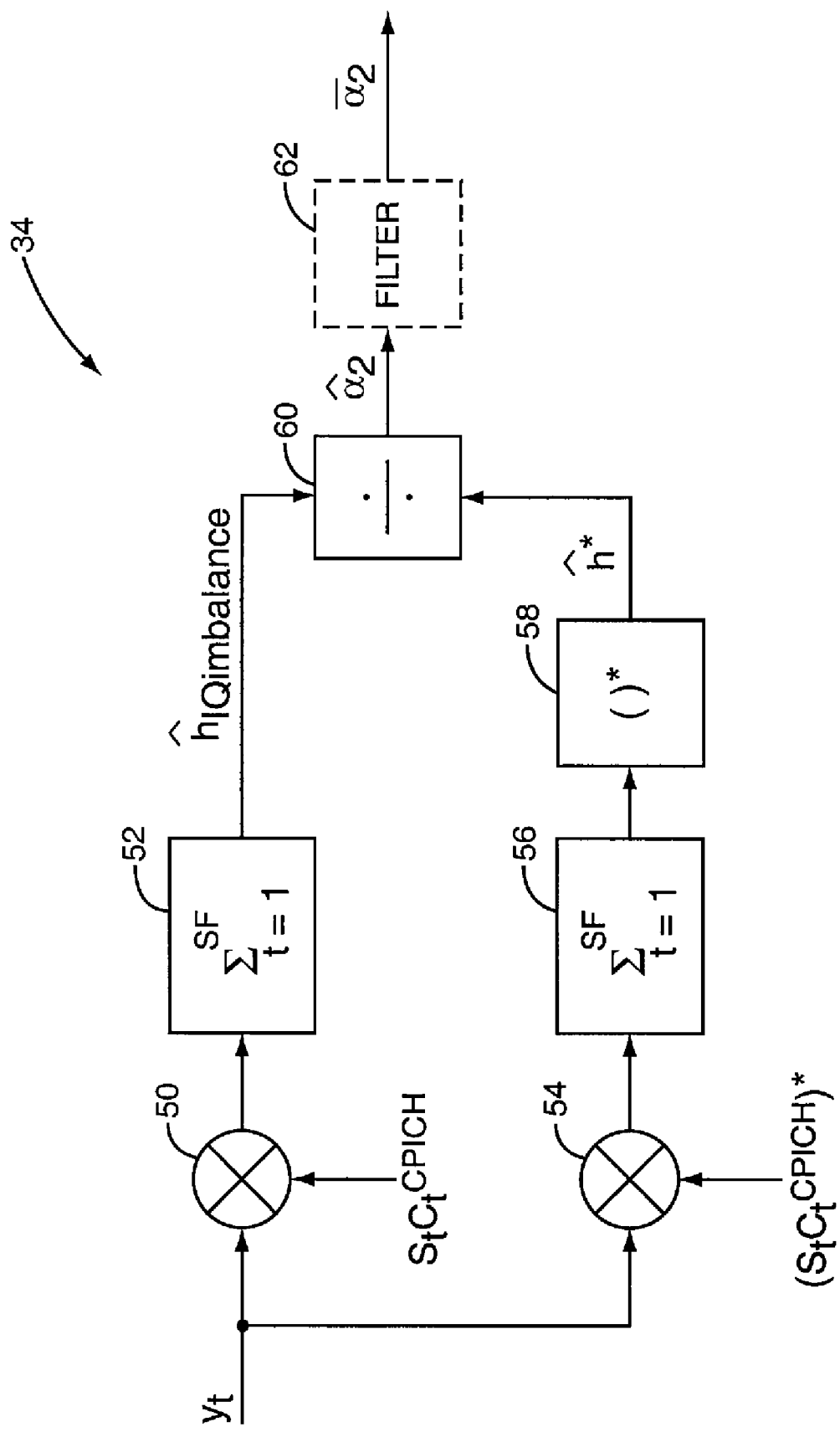
FIG. 3 is a functional block diagram of an IQ imbalance image scaling factor generation circuit.

A functional block diagram of a representative IQ imbalance image scaling factor estimator 34 is depicted in FIG. 3. An IQ imbalance image channel estimate is obtained by multiplying pilot symbols in the received signal $y_t$ by the "conjugate CPICH" at multiplier 50. Values are accumulated coherently over the spreading factor for each pilot symbol at block 52. A signal channel estimate is obtained conventionally by multiplying pilot symbols in the received signal $y_t$ by $s_t^* c_t^{CPICH}$ at multiplier 54 and coherently accumulating values at block 56. The complex conjugate of the signal channel estimate is calculated at block 58, and the IQ imbalance image channel estimate is divided by the complex conjugate of the signal channel estimate at block 60, yielding the IQ imbalance image scaling factor estimate $\hat{\alpha}_2$.

The value $\alpha_2$ is not expected to change abruptly. Thus, additional filtering may be applied to it to improve noise immunity, depicted as block 62 in FIG. 3, yielding $\overline{\alpha}_2$. For example, exponential smoothing or moving-average filtering may be used. The time constant of the filter may be adjusted based on the receiver operating status. For example, a shorter time constant may be used for modes where the automatic gain control (AGC) is changed frequently, when the temperature drift is rapid, or when other receiver operating parameters change rapidly. On the other hand, the filter time constant may be increased for more stable receiver operation—such as if one or more receiver operating parameters do not change over a predetermined duration. The filtered $\overline{\alpha}_2$ may provide a more robust IQ imbalance image scaling factor. The suppression would then be effected as $$\tilde{y}_t = y_t - \bar{\alpha}_2 y_t^* \tag{6}$$

Figure 4:
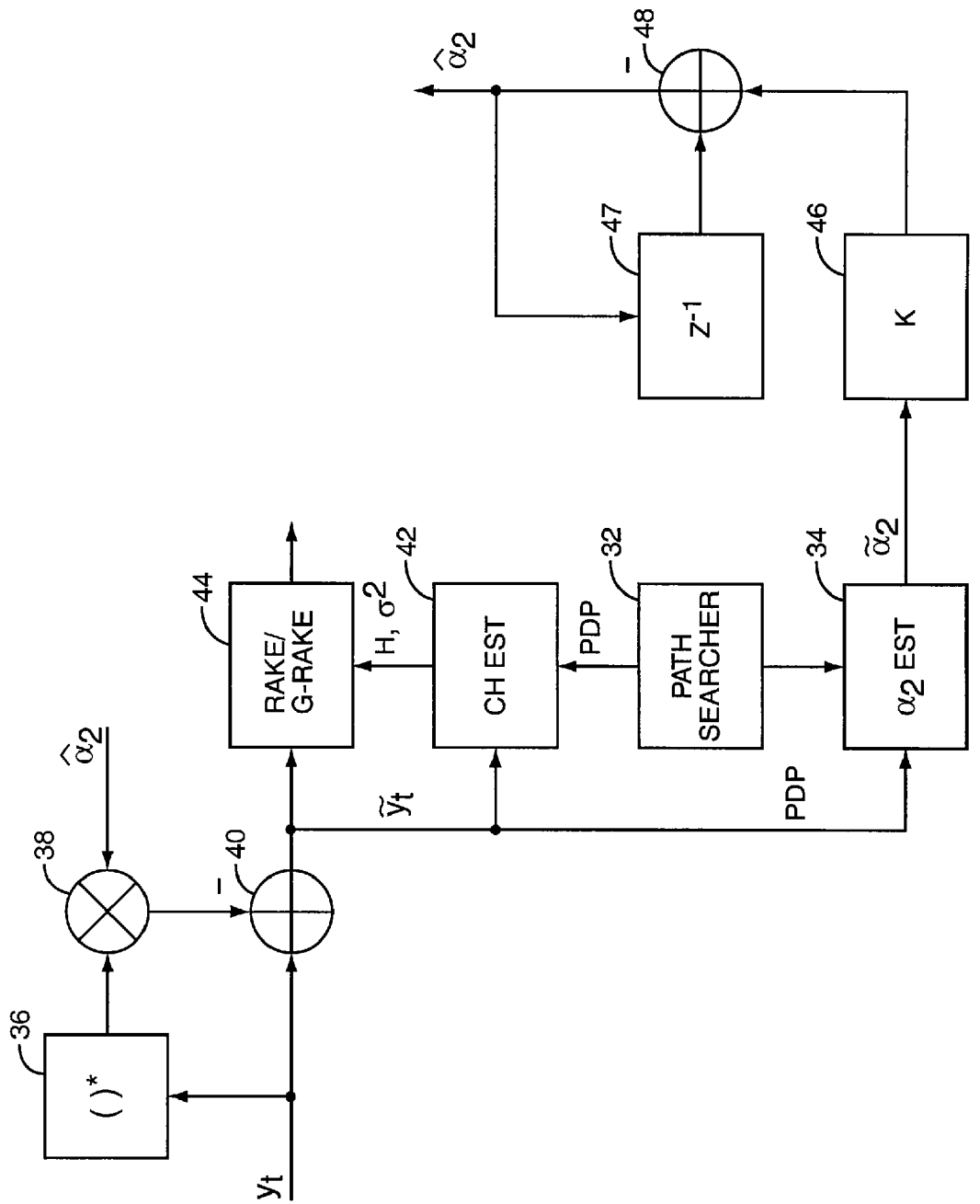
FIG. 4 is a functional block diagram of a receiver calculating and subtracting an IQ imbalance image estimate from an IQ compensated signal.

Note from FIGS. 2 and 3 that, in the embodiments disclosed therein, $\hat{\alpha}_2$ is directly estimated by measuring on data samples $y_t$, where no IQ suppression has been performed. The determined IQ imbalance image scaling factor estimate $\hat{\alpha}_2$ is then applied to another data sequence. While this is conceptually simple, it requires handling several different signal inputs (e.g., both corrected and non-corrected). FIG. 4 depicts an embodiment calculating the residual gain offset $\tilde{\alpha}_2$ remaining after the current IQ compensation is estimated and applied. Note that the IQ imbalance image scaling factor estimation function 34 receives the IQ compensated sample series $\tilde{y}_t$ rather than the uncompensated $y_t$. The residual gain offset $\tilde{\alpha}_2$ is then used to adjust the $\hat{\alpha}_2$ value for the next update interval, in a tracking control loop that attempts to drive the gain offset error $\tilde{\alpha}_2$ to zero.

In particular, the residual gain offset $\tilde{\alpha}_2$ is provided to a variable scaling block 46. The scaling block 46 is necessary to tune the sensitivity and speed of the control loop. For larger values of K, the loop reacts faster to the instantaneous detected error. However, too large a value of K will cause overshoots and instability. Representative values of the gain K are in the range 0.1-0.4. The $Z^{-1}$ delay function 47 represents a delay by one sample. The delay function 47 and summation operation 48 constitute an integrator that accumulates the instantaneous residual gain offsets $\tilde{\alpha}_2$ to update the absolute IQ imbalance image scaling factor estimate $\hat{\alpha}_2$. As with the embodiment of FIG. 2, the IQ imbalance image scaling factor estimate $\hat{\alpha}_2$ then scales the complex conjugate of the input sample stream $\tilde{y}_t$ at multiplier 38, to implement IQ imbalance according to equation (5).

Figure 5:
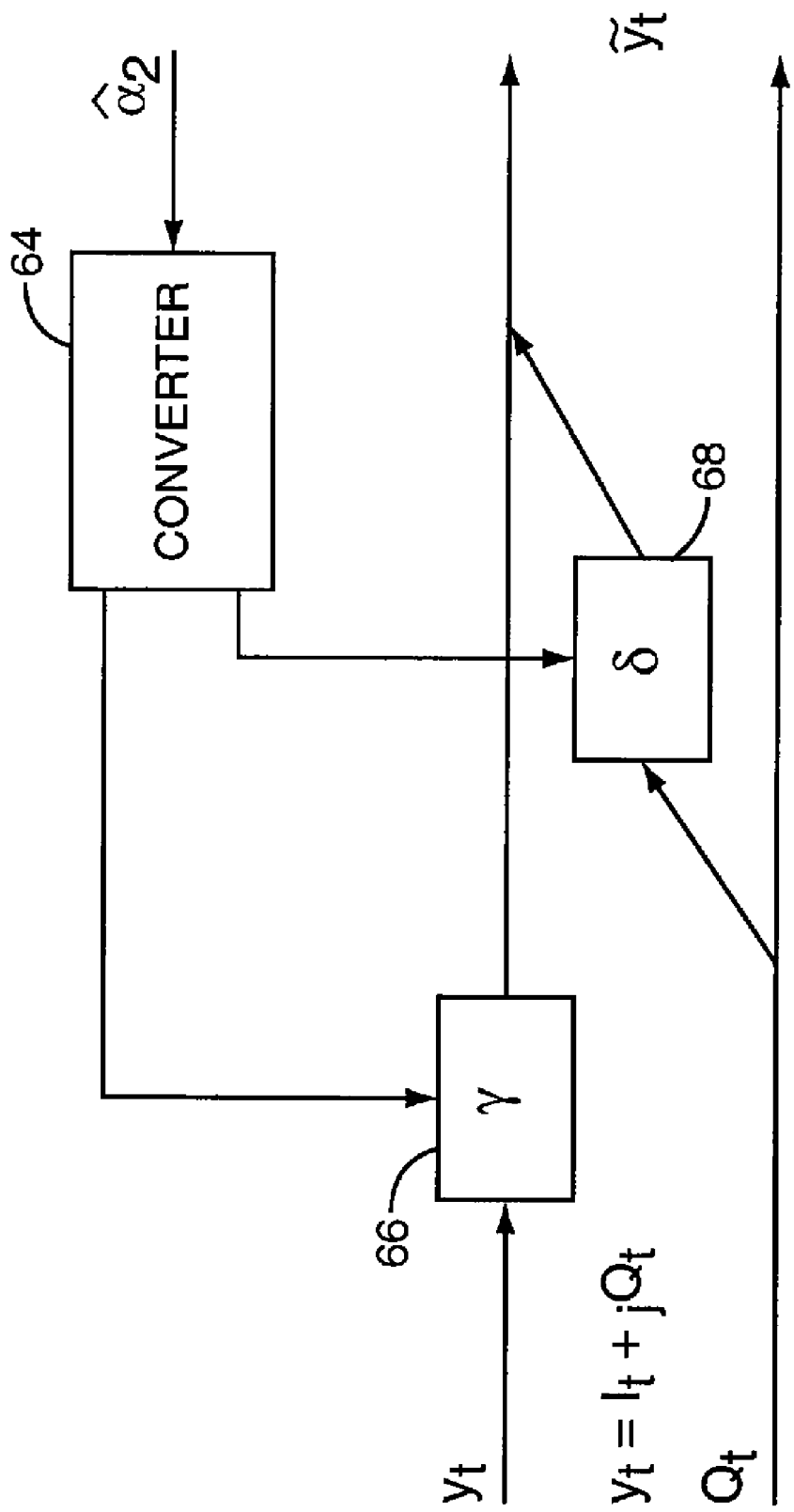
FIG. 5 is a functional block diagram of another embodiment for calculating and subtracting an IQ imbalance image estimate from a received signal.

FIG. 5 depicts an IQ imbalance compensation method according to another embodiment. A converter 64 converts the IQ imbalance image scaling factor estimate $\hat{\alpha}_2$ into $\gamma$ and $\delta$ values according to equation (1), i.e., $$IRR = \frac{\alpha_2^2}{\alpha_1^2} \gg \frac{\alpha_2^2}{1}.$$

The received signal is processed as depicted in FIG. 1, and the I and Q components are compensated by $\gamma$ and $\delta$ functions 66, 68. This processing is in lieu of blocks 36, 38, and 40 in FIG. 2. In the $\delta$ compensation, it is assumed that $\delta$ is small (e.g., less than 2 or 3 degrees). Accordingly, $\sin(\delta)=0$ and $\cos(\delta)=1$. In the case that $\delta$ is not very small, then the Q component is scaled also.

Figure 6:
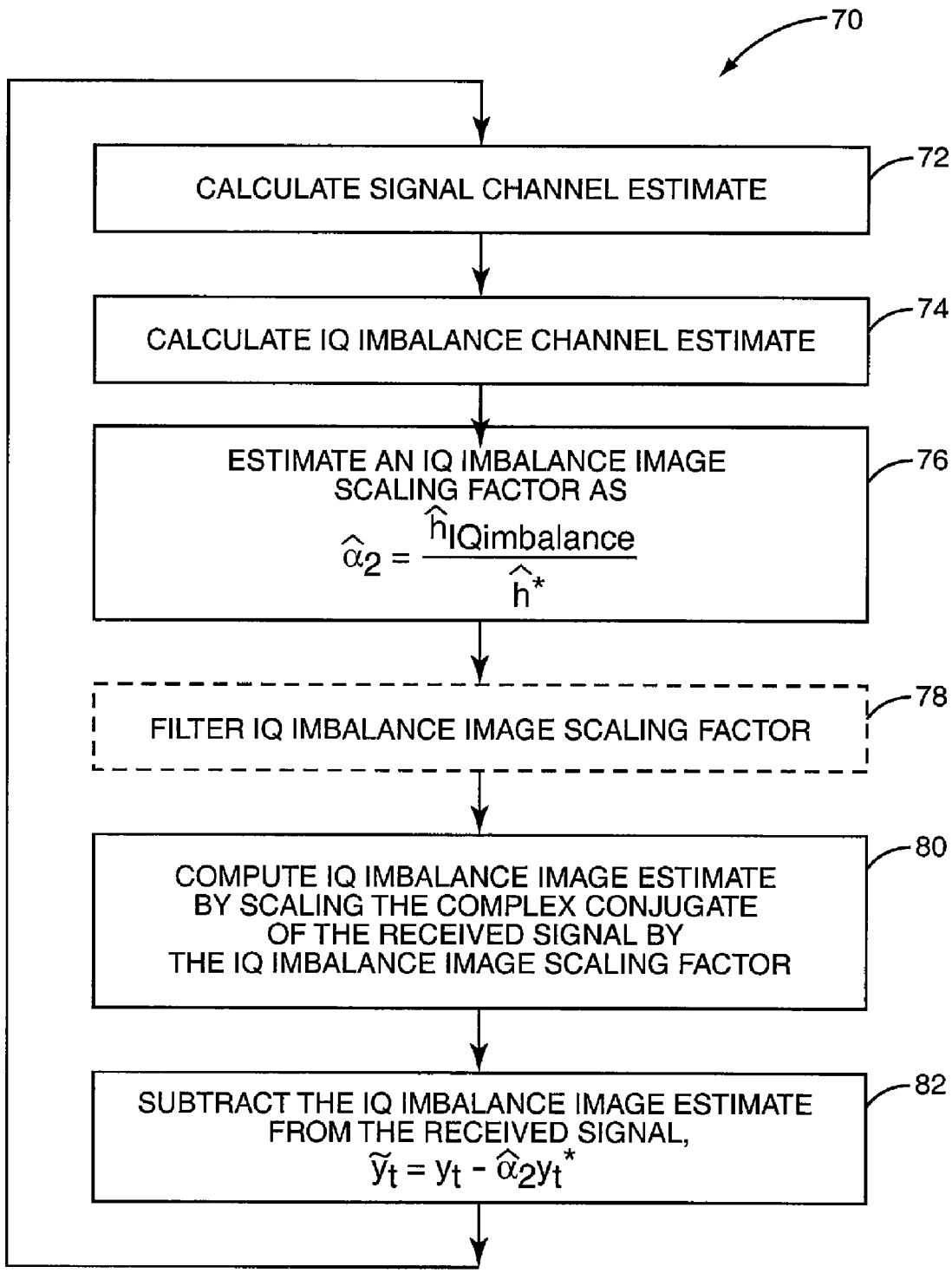
FIG. 6 is a flow diagram of a method of removing an IQ imbalance image estimate from a received signal.

FIG. 6 depicts a flow diagram of a method of IQ imbalance image component suppression according to one or more embodiments. The method "begins" by calculating an estimate of the signal channel according to conventional techniques (block 72). An estimate of the IQ imbalance image channel is calculated using the conjugate CPICH scrambling code (block 74). An IQ imbalance image scaling factor is then calculated according to equation (4) (block 76). The IQ imbalance image scaling factor may optionally be filtered (block 78). An IQ imbalance image estimate is computed by scaling the complex conjugate of the received signal by the (filtered) IQ imbalance image scaling factor (block 80). The IQ imbalance image estimate is subtracted from the received signal according to equation (5) or (6) (block 82).

Note that IQ imbalance image suppression may not always be desirable. In particular, when other noise components dominate, the subtraction of an IQ imbalance image estimate may enhance the noise rather than reduce it. To avoid this possibility, a threshold criterion may be used. For example, in one embodiment, the IQ imbalance image estimate subtraction may only be performed when $\bar{\alpha}_2 > \tau$, where $\tau$ is a predetermined threshold value, which may be implementation-specific. In another embodiment, the variance of the instantaneous values of $\alpha_2$ around $\bar{\alpha}_2$ may provide an indication as to whether the IQ imbalance contribution is relatively constant over time. The IQ imbalance suppression function could be turned off when this would not be the case, e.g., when $\text{var}|\alpha_2 - \bar{\alpha}_2| > \lambda$, where $\lambda$ is another predetermined threshold value, which may also be implementation-specific.

The IQ imbalance image cancelling techniques disclosed herein have been tested with an average white Gaussian noise (AWGN) channel and a typical RF front-end design. The IQ imbalance image cancelling algorithm has a potential to improve the $E_s/N$ in the order of 1-2 dB for high geometry factors (>20 dB), i.e., in typical MIMO and 64-QAM scenarios.

Extension of the IQ imbalance image cancelling techniques to multiple antennas is straightforward. Since each antenna has a dedicated RF front end and thereby each receiver branch experiences an independent IQ imbalance source, the suppression must be performed on per-antenna basis. That is, the strongest path on each antenna a may be used to produce the IQ imbalance image scaling factor $\alpha_2^{(a)}$ (or filtered $\bar{\alpha}_2^{(a)}$) and the IQ imbalance image suppression is achieved by the per-antenna subtraction operations $$\tilde{y}_t^{(a)} = y_t^{(a)} - \bar{\alpha}_2^{(a)} (y_t^{(a)})^* \tag{7}$$

for antennae $a = 1, 2, \ldots, n$.

The invention allows a WCDMA receiver 10, 30 to employ a simple, cost-efficient RF front-end design where higher residual impairments due to IQ imbalance is allowed, by moving IQ imbalance image suppression from RF hardware to baseband processing. The RF complexity savings may be realized in terms of chip area and/or ASIC production costs.

Those of skill in the art will readily recognize that any of the functional blocks in FIGS. 1-3 may be implemented as hardware circuits, as programmable logic, and/or as firmware or software executing on a processor or Digital Signal Processor (DSP). The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of processing a received CDMA signal in a receiver, comprising:

coherently accumulating the product of a received pilot signal, the complex conjugate of an associated scrambling code, and an associated pilot channel spreading code to generate a received signal channel estimate;

calculating an IQ imbalance image channel estimate;

dividing the IQ imbalance image channel estimate by the complex conjugate of the received signal channel estimate to generate an IQ imbalance image scaling factor;

computing an IQ imbalance image estimate by scaling the complex conjugate of the received signal by the IQ imbalance image scaling factor; and subtracting the IQ imbalance image estimate from the received signal to generate an IQ imbalance compensated signal.

2. The method of claim 1 further comprising baseband processing the received signal after subtracting the IQ imbalance image estimate.

3. The method of claim 1 further comprising filtering the IQ imbalance image scaling factor.

4. The method of claim 3 wherein the time constant of the IQ imbalance image scaling factor filter is adjusted based on the receiver operating status.

5. The method of claim 4 wherein the time constant of the IQ imbalance image scaling factor filter is reduced when the receiver operating status changes within a predetermined duration, and is increased when the receiver operating status is constant over the predetermined duration.

6. The method of claim 3 wherein subtracting the IQ imbalance image estimate from the received signal comprises subtracting the IQ imbalance image estimate from the received signal only when the variance of the instantaneous IQ imbalance image scaling factor about the filtered IQ imbalance image scaling factor is below a predetermined value.

7. The method of claim 1 wherein calculating an IQ imbalance image channel estimate comprises coherently accumulating the product of a received pilot signal, an associated scrambling code, and an associated pilot channel spreading code.

8. The method of claim 1 wherein subtracting the IQ imbalance image estimate from the received signal comprises subtracting the IQ imbalance image estimate from the received signal only when the IQ imbalance image scaling factor exceeds a predetermined value.

9. The method of claim 1 wherein the receiver includes a plurality of antennae, each receiving a CDMA signal, further comprising:
estimating an IQ imbalance image scaling factor for the signal received at each antenna;
computing an IQ imbalance image estimate for the signal received at each antenna by scaling the complex conjugate of each received signal by the associated IQ imbalance image scaling factor; and
subtracting each IQ imbalance image estimate from each respective received signal.

10. The method of claim 1 wherein subtracting the IQ imbalance image estimate from the received signal comprises implementing the equation $$\tilde{y}_t = y_t - \hat{\alpha}_2 y_t^*$$

where
$y_t$ is the received signal;
$y_t^*$ is the complex conjugate of the received signal; and
$\alpha_2$ is the IQ imbalance image scaling factor, calculated as $$\hat{\alpha}_2 = \frac{\hat{h}_{IQimbalance}}{\hat{h}^*},$$

where
$\hat{h}_{IQimbalance}$ is the IQ imbalance image channel estimate; and
$\hat{h}^*$ is the complex conjugate of the received signal channel estimate.

11. The method of claim 1 wherein estimating an IQ imbalance image scaling factor comprises:
calculating the residual gain offset remaining in the IQ imbalance compensated signal;
scaling the residual gain offset;
delaying the scaled residual gain offset by one sample; and
combining a current scaled residual gain offset with a delayed sample of the scaled residual gain offset to generate the IQ imbalance image scaling factor estimate.

12. A CDMA receiver, comprising:
an RF front end circuit operative to receive a CDMA signal from an antenna and output a complex baseband received signal comprising in-phase and quadrature components;
a channel estimator operative to generate a received signal channel estimate and an IQ imbalance image channel estimate;
an IQ imbalance image scaling factor estimator operative to generate an IQ imbalance image scaling factor by dividing the IQ imbalance image channel estimate by the complex conjugate of the received signal channel estimate; and
an IQ imbalance image estimate generator operative to scale the complex conjugate of the received signal by the IQ imbalance image scaling factor; and
a subtractor operative to subtract the IQ imbalance image estimate from the received signal.

13. The receiver of claim 12 further comprising a CDMA processing circuit operative to demodulate the received signal without the IQ imbalance image estimate.

14. The receiver of claim 13 wherein the CDMA processing circuit comprises a Rake receiver.

15. The receiver of claim 12 wherein the channel estimator is operative to generate a received signal channel estimate by coherently accumulating the product of a received pilot signal, the complex conjugate of an associated scrambling code, and an associated pilot channel spreading code.

16. The receiver of claim 12 wherein the channel estimator is operative to generate an IQ imbalance image channel estimate by coherently accumulating the product of a received pilot signal, an associated scrambling code, and an associated pilot channel spreading code.

17. The receiver of claim 12 wherein the IQ imbalance image scaling factor estimator comprises an IQ imbalance image scaling factor filter operative to filter instantaneous IQ imbalance image scaling factor values.

18. The receiver of claim 17 wherein the time constant of the IQ imbalance image scaling factor filter is reduced when the receiver operating status changes within a predetermined duration, and is increased when the receiver operating status is constant over the predetermined duration.

19. The receiver of claim 17 wherein the subtractor is operative to subtract the IQ imbalance image estimate from the received signal only when the variance of the instantaneous IQ imbalance image scaling factor about the filtered IQ imbalance image scaling factor is below a predetermined value.

20. The receiver of claim 12 further comprising:
a plurality of antennae;
a corresponding plurality of RF front end circuits, each operative to receive a CDMA signal from a different antenna and output a complex baseband received signal comprising in-phase and quadrature components;
a corresponding plurality of IQ imbalance image scaling factor estimators, each estimator operative to generate an IQ imbalance image scaling factor for the signal received at an antenna;
a corresponding plurality of IQ imbalance image estimate generators, each generator operative to scale the complex conjugate of the signal received at an antenna by the corresponding IQ imbalance image scaling factor; and a corresponding plurality of subtractors, each subtractor operative to subtract the corresponding IQ imbalance image estimate from the signal received at an antenna.

21. A CDMA receiver, comprising:

RF receiver means for receiving a CDMA signal from an antenna and outputting a complex baseband received signal comprising in-phase and quadrature components;

channel estimator means for generating a received signal channel estimate and an IQ imbalance image channel estimate;

scaling factor estimating means for generating an IQ imbalance image scaling factor by dividing the IQ imbalance image channel estimate by the complex conjugate of the received signal channel estimate; and IQ imbalance image estimating means for scaling the complex conjugate of the received signal by the IQ imbalance image scaling factor; and subtraction means for subtracting the IQ imbalance image estimate from the received signal.

* * * * *

UNITED STATES PATENT AND TRADEMARK OFFICE
CERTIFICATE OF CORRECTION

| | | |
|---|---|---|
| PATENT NO. | : 7,894,555 B2 | Page 1 of 1 |
| APPLICATION NO. | : 11/832695 | |
| DATED | : February 22, 2011 | |
| INVENTOR(S) | : Lindoff et al. | |

It is certified that error appears in the above-identified patent and that said Letters Patent is hereby corrected as shown below:

Title Page;
On Page 2, in Field (56), under "OTHER PUBLICATIONS", in Column 2, Line 11, delete "I/O" and insert -- I/Q --, therefor.

Signed and Sealed this

Nineteenth Day of July, 2011

David J. Kappos
*Director of the United States Patent and Trademark Office*